(12) United States Patent
Berels et al.

(10) Patent No.: US 11,364,956 B2
(45) Date of Patent: Jun. 21, 2022

(54) MOTOR VEHICLE FLOOR ASSEMBLY WITH RECESSES FOR ELECTRICAL LINES AND ELECTRICAL MODULES

(71) Applicant: Ford Global Technologies, LLC, Dearborn, MI (US)

(72) Inventors: David Jeffeory Berels, Plymouth, MI (US); Jonathan Engels, Tecumseh, MI (US); Scott Mayberry, Allen Park, MI (US); Galen Keith Thomas, Dearborn, MI (US); Matthew V. Volpone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 397 days.

(21) Appl. No.: 16/710,748

(22) Filed: Dec. 11, 2019

(65) Prior Publication Data

US 2021/0179188 A1    Jun. 17, 2021

(51) Int. Cl.
| | |
|---|---|
| *B60J 7/00* | (2006.01) |
| *B62D 25/20* | (2006.01) |
| *B60L 50/60* | (2019.01) |
| *B60R 16/02* | (2006.01) |
| *B60K 6/28* | (2007.10) |

(52) U.S. Cl.
CPC .............. *B62D 25/20* (2013.01); *B60L 50/66* (2019.02); *B60R 16/0215* (2013.01); *B60K 6/28* (2013.01); *B60Y 2200/91* (2013.01); *B60Y 2200/92* (2013.01)

(58) Field of Classification Search
CPC .... A61K 38/00; B65H 2701/31; E21B 23/03; B32B 7/12; Y02E 60/10; H01L 2924/00; A61P 43/00; H04R 25/606; Y02T 10/70; G02B 6/4202
See application file for complete search history.

(56) References Cited

U.S. PATENT DOCUMENTS

| | | | | |
|---|---|---|---|---|
| 4,940,282 A | * | 7/1990 | Townsend | B62D 25/20 296/187.03 |
| 7,111,900 B2 | | 9/2006 | Chernoff et al. | |
| 7,978,481 B2 | * | 7/2011 | Tsuchiya | B60K 1/04 361/728 |
| 8,946,551 B2 | * | 2/2015 | Hudson | B60R 16/0215 174/72 A |
| 9,722,223 B1 | * | 8/2017 | Maguire | H01M 50/20 |
| 2009/0325049 A1 | * | 12/2009 | Niedzwiecki | H01M 50/20 429/100 |
| 2013/0169041 A1 | | 7/2013 | Fukaya | |
| 2019/0237721 A1 | | 8/2019 | Reimer et al. | |

(Continued)

FOREIGN PATENT DOCUMENTS

| | | |
|---|---|---|
| IN | 201641032884 | 3/2018 |
| JP | 2011182589 A | 9/2011 |

(Continued)

*Primary Examiner* — Kiran B Patel
(74) *Attorney, Agent, or Firm* — David B. Kelley; Carlson, Gaskey & Olds, P.C.

(57) ABSTRACT

This disclosure relates to a motor vehicle floor assembly with recesses for electrical lines and electrical modules, and a corresponding method. An example assembly includes a floor with a surface, a channel at a first depth relative to the surface, and a pocket at a second depth relative to the surface. The second depth is greater than the first depth.

20 Claims, 3 Drawing Sheets

(56) References Cited

U.S. PATENT DOCUMENTS

| | | | | |
|---|---|---|---|---|
| 2019/0326582 A1* | 10/2019 | Berels | ................. | H01M 50/502 |
| 2021/0083343 A1* | 3/2021 | West | ................. | H01M 10/6568 |
| 2021/0138886 A1* | 5/2021 | Spielvogel | .............. | F28F 1/022 |
| 2021/0179188 A1* | 6/2021 | Berels | ................. | B62D 25/2009 |
| 2021/0257598 A1* | 8/2021 | Obeid | ................. | H01M 50/298 |
| 2021/0394780 A1* | 12/2021 | Thomas | ................. | B60W 10/08 |
| 2021/0397178 A1* | 12/2021 | Thomas | ............... | G05D 1/0011 |
| 2022/0017031 A1* | 1/2022 | Smith | ..................... | B60K 1/04 |

FOREIGN PATENT DOCUMENTS

| | | | |
|---|---|---|---|
| JP | 6347541 B2 | 11/2015 | |
| JP | 2019137394 A | 8/2019 | |
| WO | 2020137614 A1 | 7/2020 | |

* cited by examiner

MOTOR VEHICLE FLOOR ASSEMBLY WITH RECESSES FOR ELECTRICAL LINES AND ELECTRICAL MODULES

TECHNICAL FIELD

This disclosure relates to a motor vehicle floor assembly with recesses for electrical lines and electrical modules, and a corresponding method.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs). The traction batteries of electrified vehicles can include a battery pack secured to an underbody of the vehicle.

SUMMARY

An assembly for a motor vehicle according to an exemplary aspect of the present disclosure includes, among other things, a floor including a surface, a channel at a first depth relative to the surface, and a pocket at a second depth relative to the surface, wherein the second depth is greater than the first depth.

In a further non-limiting embodiment of the foregoing assembly, the surface is an uppermost surface, and the first and second depths are beneath the uppermost surface.

In a further non-limiting embodiment of the foregoing assembly, the assembly includes an electrical line in the channel, and an electrical module in the pocket. Further, the electrical line is electrically connected to the electrical module.

In a further non-limiting embodiment of any of the foregoing assemblies, the electrical line is adhered to the channel using adhesive.

In a further non-limiting embodiment of any of the foregoing assemblies, the electrical line is one of a wire, wire harness, a busbar, and a circuit trace, and the electrical module is one of a printed circuit board and an electrical connection.

In a further non-limiting embodiment of any of the foregoing assemblies, the pocket is arranged at a first end of the channel.

In a further non-limiting embodiment of any of the foregoing assemblies, the pocket is a first pocket and the assembly further includes a second pocket arranged at a second end of the channel opposite the first end.

In a further non-limiting embodiment of any of the foregoing assemblies, the first and second pockets are arranged adjacent opposite corners of the floor.

In a further non-limiting embodiment of any of the foregoing assemblies, the channel is a first channel and the assembly further includes a second channel, and the assembly further includes a third pocket and a fourth pocket arranged at opposite ends of the second channel.

In a further non-limiting embodiment of any of the foregoing assemblies, the second channel is arranged at the first depth beneath the uppermost surface, an electrical line is arranged in the second channel, the second, third, and fourth pockets are arranged at the second depth beneath the uppermost surface, and an electrical module is arranged in each of the second, third, and fourth pockets.

In a further non-limiting embodiment of any of the foregoing assemblies, the first and second channels intersect at a center of the floor.

In a further non-limiting embodiment of any of the foregoing assemblies, the assembly includes first and second bypass channels directly connecting the first and second channels and spaced-apart from the center of the floor.

In a further non-limiting embodiment of any of the foregoing assemblies, the assembly includes first and second longitudinal channels extending along respective first and second sides of the floor.

In a further non-limiting embodiment of any of the foregoing assemblies, the first longitudinal channel extends between the first pocket and the fourth pocket, and the second longitudinal channel extends between the second pocket and the third pocket.

In a further non-limiting embodiment of any of the foregoing assemblies, the first and second longitudinal channels are at the first depth beneath the uppermost surface.

In a further non-limiting embodiment of any of the foregoing assemblies, the floor also provides an upper cover of an enclosure of a battery assembly, and the motor vehicle is an electrified vehicle.

An electrified vehicle according to an exemplary aspect of the present disclosure includes, among other things, an electric machine configured to drive wheels of the electrified vehicle. The vehicle further includes a battery assembly including at least one array of battery cells configured to deliver power to the electric machine. The battery assembly further includes a cover comprising a surface, a channel at a first depth relative to the surface, and a pocket at a second depth relative to the surface, wherein the second depth is greater than the first depth. The vehicle further includes an electrical line in the channel, and an electrical module in the pocket. The electrical line is electrically connected to the electrical module.

In a further non-limiting embodiment of the foregoing electrified vehicle, the cover also provides a floor of the electrified vehicle.

A method according to an exemplary aspect of the present disclosure includes, among other things, electrically connecting a first load to a second load via an electrical line and an electrical module. The electrical line is in a channel of a floor of a motor vehicle and the electrical module is in a pocket of the floor. The channel is at a first depth relative to a surface of the floor, and the pocket is at a second depth greater than the first depth relative to the uppermost surface of the floor.

In a further non-limiting embodiment of the foregoing methods, the floor is a cover of a battery assembly of the motor vehicle.

DETAILED DESCRIPTION

This disclosure relates to a motor vehicle floor assembly with recesses for electrical lines and electrical modules, and a corresponding method. An example assembly includes a floor with a surface, a channel at a first depth relative to the surface, and a pocket at a second depth relative to the surface. The second depth is greater than the first depth. This disclosure uses the floor to facilitate electrical connections between electrical loads and/or power sources. This disclosure can be used to facilitate various different electrical connections in a relatively compact package. These and other benefits will be appreciated from the below description.

Figure 1:
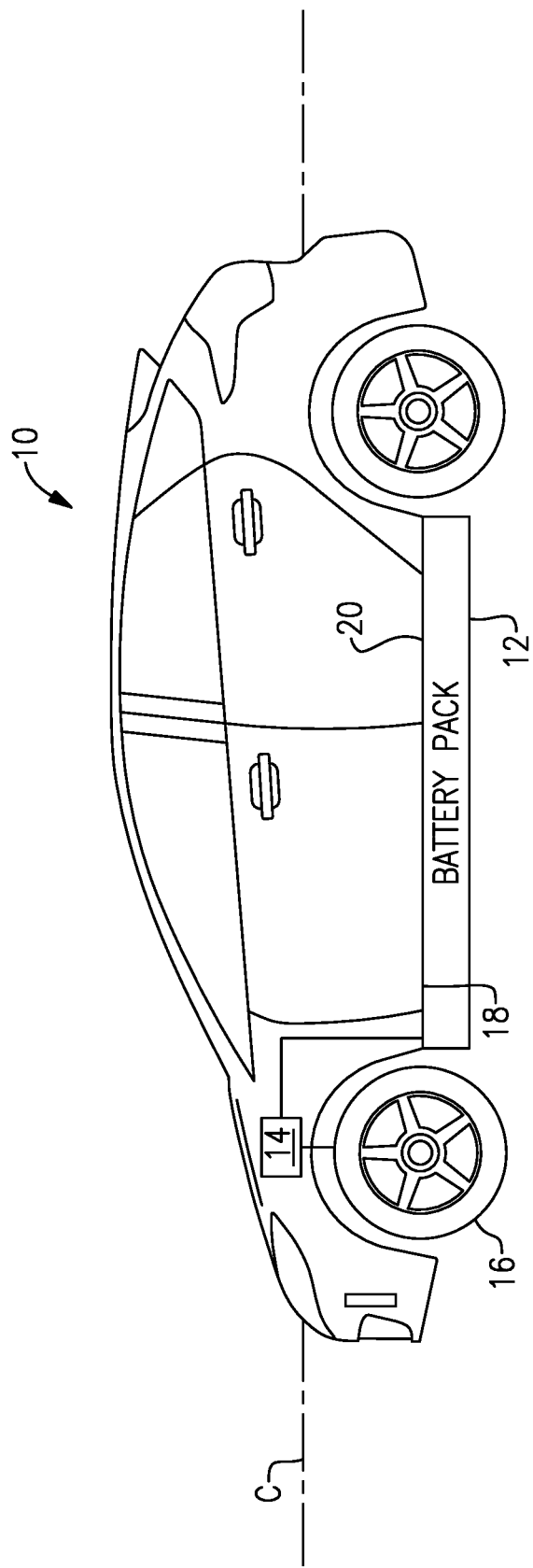
FIG. 1 is a somewhat schematic, side view of an example motor vehicle.

Referring to FIG. 1, an example motor vehicle 10 ("vehicle 10"), which in this example is an electrified vehicle, includes a battery pack 12 ("battery 12") that powers an electric machine 14. The vehicle includes wheels 16 driven by the electric machine 14. The electric machine 14 receives electric power from the battery 12 and converts the electric power to torque to drive the wheels 16. The battery 12 is a relatively high voltage (e.g., greater than or equal to 60 $V_{DC}$, 30 $V_{AC}$) battery in this example.

The vehicle 10 in FIG. 1 is an all-electric vehicle. In other examples, the vehicle 10 is a hybrid electric vehicle, which selectively drives wheels using torque provided by an internal combustion engine instead of, or in addition to, the electric machine 14. This disclosure also extends to motor vehicles which are not electrified vehicles such as those that are driven solely by an internal combustion engine.

The vehicle 10 includes an underbody 18. The battery 12 is secured adjacent the underbody 18. In this example, an upper, or top, cover 20 of the battery 12 provides a floor of a passenger cabin of the vehicle 10. In one example, the cover 20 is not directly exposed to passengers, and may be covered by carpet, padding, and/or upholstery. The cover 20, in this example, serves as a portion of an enclosure assembly of the battery 12 and also as the floor of the passenger cabin of the vehicle 10. In this example, the enclosure assembly of the battery 12 includes portions of the vehicle frame, such as the side rails. In other examples, the enclosure assembly includes a tray and one or more walls. In either example, the cover 20 is configured to enclose and seal an interior of the battery 12, which contains one or more arrays of battery cells. The cover 20 may be formed separately from or integrally with the other walls/tray of the enclosure assembly.

As mentioned above, this disclosure extends to vehicles which are not electrified vehicles. Such vehicles do not include the battery 12. In this sense, the cover 20 is representative of a panel providing a floor of the vehicle 10. The cover 20 may be referred to as a floor herein.

Figure 2:
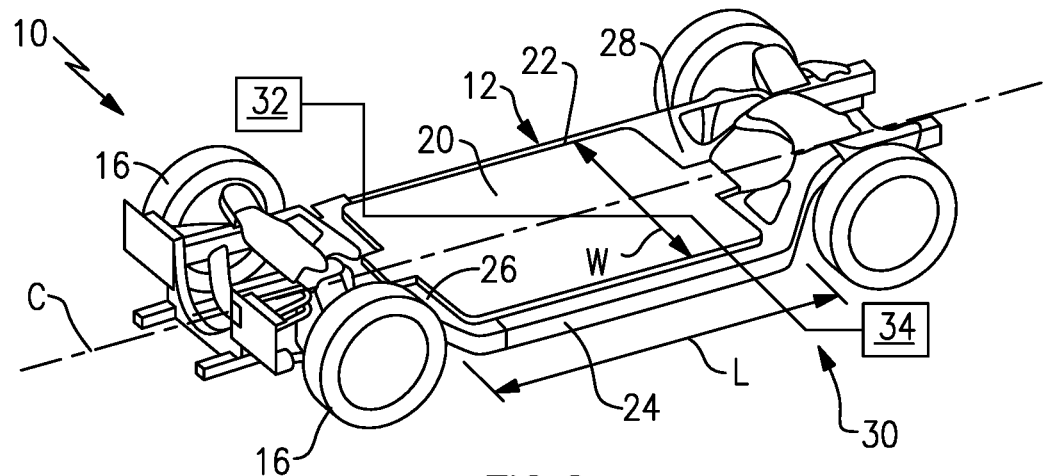
FIG. 2 is a perspective view of a portion of a frame of the vehicle and a battery cover. In the example of FIG. 2, the cover also provides a floor of the vehicle.

FIG. 2 illustrates the cover 20 relative to portions of a frame of the vehicle 10. In FIG. 2, the cover 20 is arranged between frame rails 22, 24, which are structures extending along opposed sides of the vehicle 10 in directions generally parallel to a centerline C of the vehicle 10. The cover 20 has a length L extending in a direction parallel to the centerline C, and a width W extending in a direction normal to the centerline C. In this example, the width W is such that the cover 20 contacts both frame rails 22, 24. The rails 22, 24 are connected together by a plurality of cross-members 26, 28 extending in a direction substantially normal to the centerline C. In this example, the length L of the cover 20 extends along a majority of a length of the vehicle 10, from substantially a B-pillar of the vehicle to a C-pillar or D-pillar, if present.

The cover 20 may be made of a polymer material, in one example, and may be made using a known manufacturing technique. In a particular example, the cover 20 may be made using a sheet molding compound (SMC) process, and may be made of a reinforced composite SMC material including glass-fiber reinforced polyester, for example.

This disclosure uses the cover 20 to facilitate electrical connections within the vehicle 10, and is particularly useful in making relatively direct connections between electrical loads and/or power sources which are arranged on opposite sides of the vehicle 10. Specifically, the cover 20 includes a plurality of recesses configured to facilitate such electrical connections.

The vehicle 10 includes an electrical distribution system ("EDS") 30, which electrically couples power sources and/or electrical loads to one another. As one example, the electrical distribution system 30 electrically couples a first load 32 to a second load 34 via electrical lines and electrical modules which have been routed using the cover 20. The first and second loads 32, 34 could include the battery 12, electric machine 14, or other loads. One of the first and second loads 32, 34 may be a power source. The electrical distribution system 30 includes one or more electrical wires, electrical cables, bus bars (sometimes spelled "busbars"), circuit traces, electrical connectors, etc., as necessary to electrically couple electrical components to one another. Portions of the electrical distribution system 30 may be attached or adhered to the cover 20. In this sense, the cover 20 acts essentially as a substrate which directly supports electronics, somewhat similar to a printed circuit board substrate.

Figure 3:
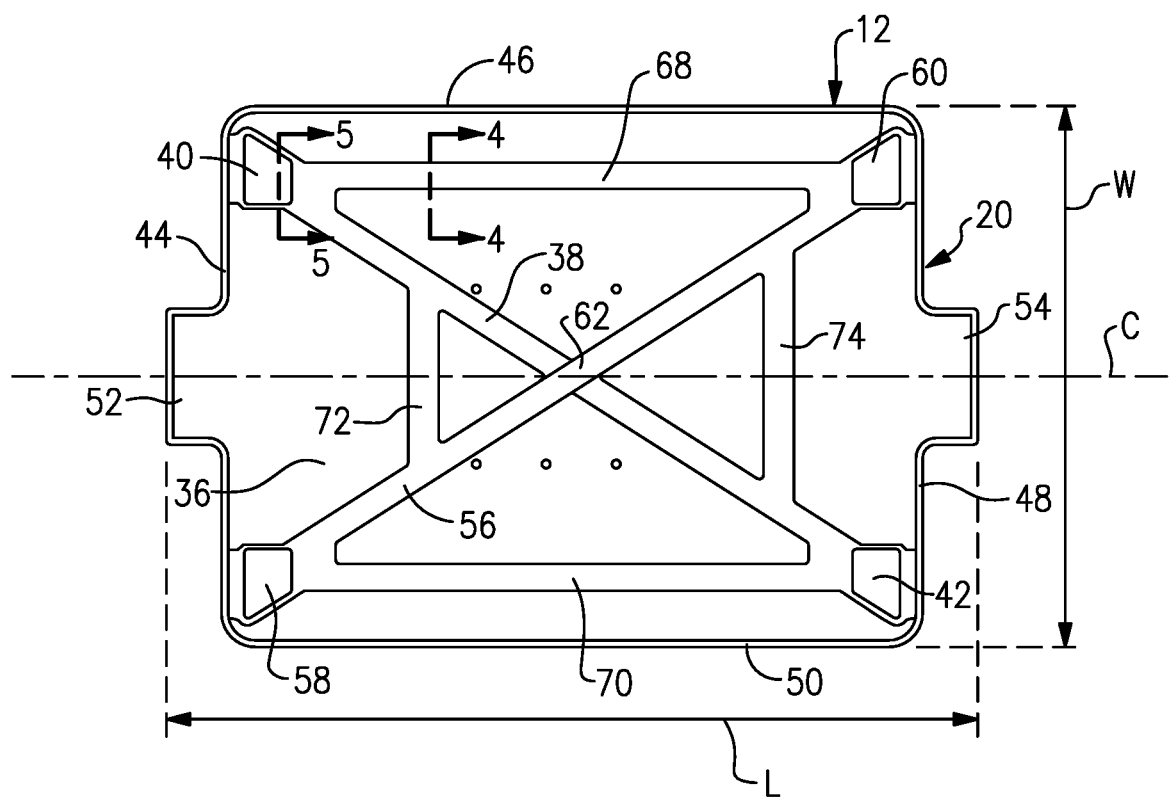
FIG. 3 is a top view of the cover of FIG. 2.

FIG. 3 is a top view of the cover 20 and illustrates an example recess arrangement. As shown in FIG. 3, the cover 20 includes an uppermost surface 36 and a plurality of recesses arranged beneath the uppermost surface 36. In this example, the recesses include channels and pockets. The recesses are open toward the uppermost surface, meaning they are bound on all sides except the top side in this example. The cover 20 includes at least one channel at a first depth beneath the uppermost surface, and at least one pocket at a second depth greater than the first depth beneath the uppermost surface. The channels are configured to receive electrical lines, such as wires, busbars, circuit traces, flexible printed circuits (FPCs), and flexible flat circuits (FFCs), and the pockets are configured to receive electrical modules such as printed circuit boards and electrical connectors (i.e., plugs).

In the example of FIG. 3, the cover 20 includes a first channel 38 extending diagonally from a first pocket 40 to a second pocket 42. The first and second pockets 40, 42 are arranged adjacent opposite corners of the cover 20. Specifically, the first pocket 40 is arranged adjacent an intersection of a first (i.e., front) end 44 of the cover 20 and a first (i.e., passenger) side 46 of the cover 20. The second pocket 42 is arranged adjacent an intersection of a second (i.e., rear) end 48 of the cover 20 and a second (i.e., driver) side 50. The first and second sides 46, 50 are spaced-apart by the width W. The first and second ends 44, 48 are spaced-apart by a distance generally equal to the length L, although the length L is inclusive of projections 52, 54, which are used to connect the cover 20 to the cross-members 26, 28.

The cover 20 further includes a second channel 56 extending diagonally from a third pocket 58 to a fourth pocket 60. The third and fourth pockets 58, 60 are also arranged adjacent opposite corners of the cover 20. Namely, the third pocket 58 is arranged adjacent an intersection of the first end 44 and the second side 50, and the fourth pocket 60 is arranged adjacent an intersection of the first side 46 and the second end 48.

In this example, the first and second channels 38, 56 extend in directions transverse to one another and to the centerline C. The first and second channels 38, 56 intersect at an intersection 62 which includes a center of the cover 20. When the cover 20 is mounted to the vehicle 10, the centerline C passes through the intersection 62.

Figure 4:
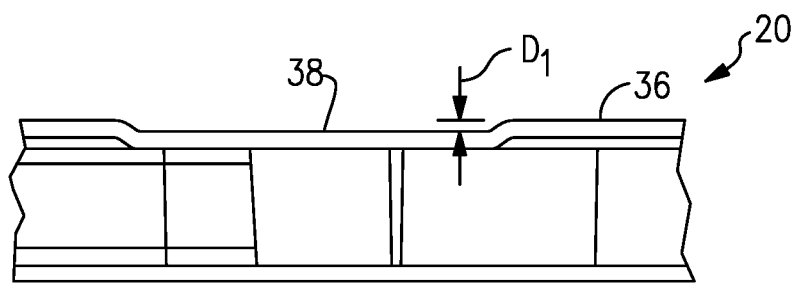
FIG. 4 is a cross-sectional view of the cover taken along line 4-4 in FIG. 3.

The first and second channels 38, 56 are arranged at the first depth $D_1$ beneath the uppermost surface 36 in this example. For instance, FIG. 4 is a cross-sectional view illustrating the first channel 38 spaced-apart from the uppermost surface 36 by the first depth $D_1$. Specifically, a bottom surface of the first channel 38 is spaced-apart from the uppermost surface 36 by the first depth $D_1$. The first depth $D_1$ is relatively shallow compared to a depth of the pockets, in this example. The first and second channels 38, 56 could be at different depths in other examples.

Figure 5:
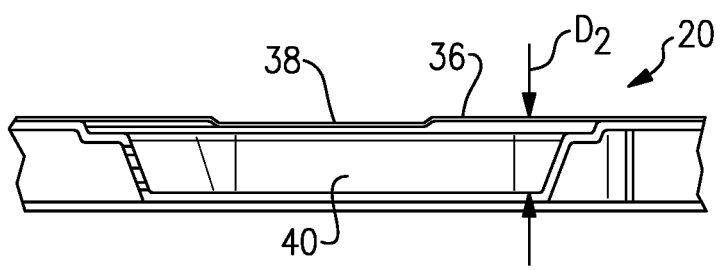
FIG. 5 is a cross-sectional view of the cover taken along line 5-5 in FIG. 3.

The first, second, third, and fourth pockets 40, 42, 58, 60 are arranged such that a bottom surface of the respective pocket is at the second depth $D_2$ beneath the uppermost surface 36. FIG. 5 is a cross-sectional view illustrating the first pocket 40 at the second depth $D_2$ beneath the uppermost surface 36. The second depth $D_2$ is greater than the first depth $D_1$.

While in the illustrated embodiment the channels and pockets are arranged beneath the uppermost surface of the cover/floor, the channels and pockets could be arranged relative to a bottommost surface of the cover/floor. In that case, the channels and pockets would be recessed upwardly relative to the bottommost surface. In this context, the "depth" of the channels and pockets is measured upward from a bottommost surface of the cover.

The first and second channels 38, 56 are open at their ends to respective pockets. For instance, the first channel 38 is open to the first and second pockets 40, 42, and the second channel 56 is open to the third and fourth pockets 58, 60. In this way, electrical lines within the channels may be electrically connected to electrical modules within the respective pockets.

Figure 6:
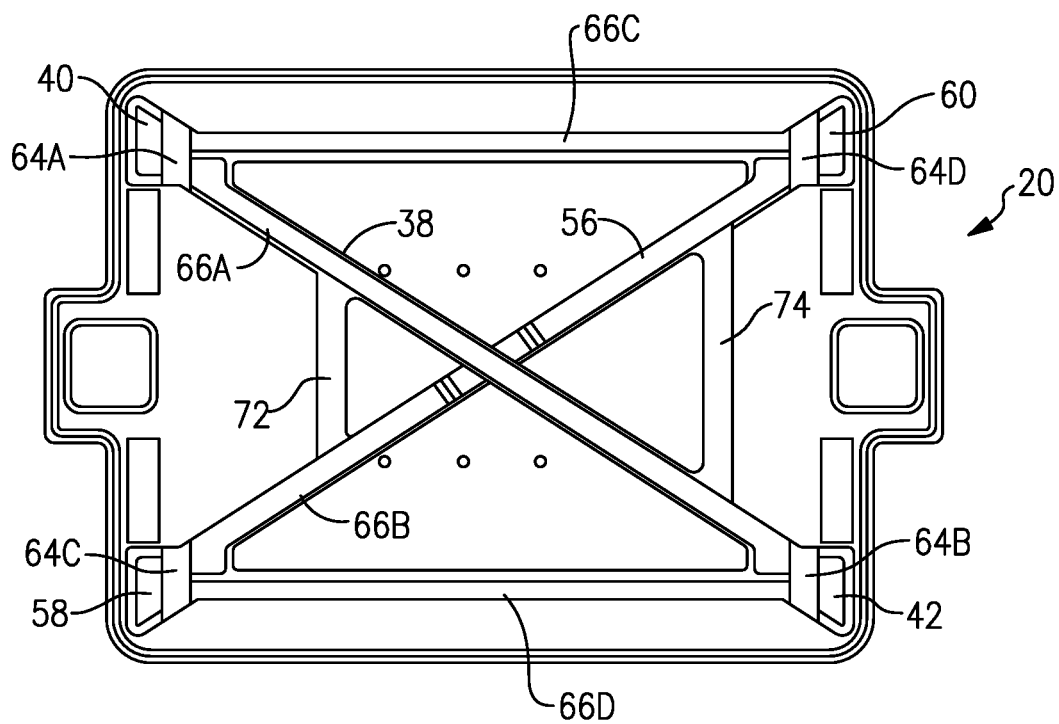
FIG. 6 is a top view of the cover with electrical lines and electrical modules arranged in recesses of the cover.

FIG. 6 illustrates four electrical modules 64A-64D, each arranged within one of the first, second, third, and fourth pockets 40, 42, 58, 60. The electrical modules 64A-64D in this example are printed circuit boards, but could be other types of electrical modules including various types of electrical couplings or connections such as plugs. Electrical modules 64A and 64B are electrically connected in this example by at least one first electrical line 66A, which is arranged in the first channel 38. Electrical modules 64C and 64D are likewise electrically connected by at least one second electrical line 66B, which is arranged in the second channel 56. While there is only one electrical module in each of the pockets in FIG. 6, there could be a different number of electrical modules in each pocket, including zero electrical modules in some pockets. Further, each channel could contain a plurality of distinct electrical lines, each electrically connecting different electrical modules within the pockets.

In this example, the first and second electrical lines 66A, 66B are entirely within the respective channel, meaning they do not protrude above the uppermost surface 36. In other examples, the first and second electrical lines 66A, 66B are arranged partially within the respective channel.

The first and second electrical lines 66A, 66B may be single electrical lines or a group of electrical lines. The first and second electrical lines 66A, 66B may include one or more cables, busbars, ribbon cables, wires, wire harnesses, circuit traces, painted circuit tracings, etc. The electrical lines 66A, 66B are relatively flat given the relatively shallow depth of the channels 38, 56. The first and second electrical lines 66A, 66B may be attached to the channels using known attachment techniques. In one example, the first and second electrical lines 66A, 66B are adhered to the respective channels 38, 56 using an adhesive. In another example, the first and second electrical lines 66A, 66B are laminated in the respective channels 38, 56. This disclosure is not limited to adhesive of lamination and extends to other retention methods.

With reference to FIG. 3, the cover 20 in this example also includes first and second longitudinal channels 68, 70 adjacent and extending along respective first and second sides 46, 50. The first and second longitudinal channels 68, 70 extend in directions substantially parallel to one another and parallel to the centerline C. The first and second longitudinal channels 68, 70 may be arranged at the first depth $D_1$ beneath the uppermost surface 36 or at a different depth.

The first longitudinal channel 68 extends between the first pocket 40 and the fourth pocket 60. The second longitudinal channel 70 extends between the third pocket 58 and the second pocket 42. The first and second longitudinal channels 68, 70 may include third and fourth electrical lines 66C, 66D, as shown in FIG. 5. The third electrical line 66C, in this example, electrically connects the first electrical module 64A directly to the fourth electrical module 64D. Likewise, the fourth electrical line 66D electrically connects the second electrical module 64B directly to the third electrical module 64C.

The cover 20 in this example also includes first and second bypass channels 72, 74 directly connecting the first and second channels 38, 56 and spaced-apart from the intersection 62. The first and second bypass channels 72, 74 are arranged at the first depth $D_1$ beneath the uppermost surface 36 or at a different depth. The first and second bypass channels 72, 74 extend in a direction parallel to the width W and normal to the centerline C in this example. The first and second bypass channels 72, 74 are spaced-apart from the intersection 62 by different distances, in this example. The first and second bypass channels 72, 74 could be equidistant from the intersection 62 in other examples. In FIG. 6, there are no electrical lines within the first and second bypass channels 72, 74. However, electrical lines could be routed more directly between modules at the same end of the cover 20 using the first and second bypass channels 72, 74.

While a particular configuration of the cover 20 has been shown in the figures and discussed above, it should be understood that modifications of the cover 20 come within the scope of this disclosure. For instance, the cover 20 could include the channels 38, 56, but not the longitudinal channels 68, 70 or the bypass channels 72, 74. As another example, the cover 20 could include the longitudinal channels 68, 70, but not the channels 38, 56.

It should be understood that terms such as "about," "substantially," and "generally" are not intended to be boundaryless terms, and should be interpreted consistent with the way one skilled in the art would interpret those terms. It should also be understood that directional terms such as "front," "rear," "upper," "beneath," "side," "end," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly for a motor vehicle, comprising:
a floor including a surface, a channel at a first depth relative to the surface, and a pocket at a second depth relative to the surface, wherein the second depth is greater than the first depth.

2. The assembly as recited in claim 1, wherein the surface is an uppermost surface, and the first and second depths are beneath the uppermost surface.

3. The assembly as recited in claim 1, further comprising:
an electrical line in the channel; and
an electrical module in the pocket, wherein the electrical line is electrically connected to the electrical module.

4. The assembly as recited in claim 3, wherein the electrical line is adhered to the channel using adhesive.

5. The assembly as recited in claim 3, wherein:
the electrical line is one of a wire, wire harness, a busbar, and a circuit trace, and
the electrical module is one of a printed circuit board and an electrical connection.

6. The assembly as recited in claim 2, wherein the pocket is arranged at a first end of the channel.

7. The assembly as recited in claim 6, wherein the pocket is a first pocket and the assembly further includes a second pocket arranged at a second end of the channel opposite the first end.

8. The assembly as recited in claim 7, wherein the first and second pockets are arranged adjacent opposite corners of the floor.

9. The assembly as recited in claim 8, wherein:
the channel is a first channel and the assembly further includes a second channel, and
the assembly further includes a third pocket and a fourth pocket arranged at opposite ends of the second channel.

10. The assembly as recited in claim 9, wherein:
the second channel is arranged at the first depth beneath the uppermost surface,
an electrical line is arranged in the second channel,
the second, third, and fourth pockets are arranged at the second depth beneath the uppermost surface,
an electrical module is arranged in each of the second, third, and fourth pockets.

11. The assembly as recited in claim 9, wherein the first and second channels intersect at a center of the floor.

12. The assembly as recited in claim 11, further comprising:
first and second bypass channels directly connecting the first and second channels and spaced-apart from the center of the floor.

13. The assembly as recited in claim 9, further comprising:
first and second longitudinal channels extending along respective first and second sides of the floor.

14. The assembly as recited in claim 13, wherein:
the first longitudinal channel extends between the first pocket and the fourth pocket, and
the second longitudinal channel extends between the second pocket and the third pocket.

15. The assembly as recited in claim 13, wherein the first and second longitudinal channels are at the first depth beneath the uppermost surface.

16. The assembly as recited in claim 1, wherein:
the floor also provides an upper cover of an enclosure of a battery assembly,
the motor vehicle is an electrified vehicle.

17. An electrified vehicle, comprising:
an electric machine configured to drive wheels of the electrified vehicle;
a battery assembly including at least one array of battery cells configured to deliver power to the electric machine, wherein the battery assembly further includes a cover comprising a surface, a channel at a first depth relative to the surface, and a pocket at a second depth relative to the surface, wherein the second depth is greater than the first depth; and
an electrical line in the channel; and
an electrical module in the pocket, wherein the electrical line is electrically connected to the electrical module.

18. The electrified vehicle as recited in claim 17, wherein the cover also provides a floor of the electrified vehicle.

19. A method, comprising:
electrically connecting a first load to a second load via an electrical line and an electrical module, wherein the electrical line is in a channel of a floor of a motor vehicle and the electrical module is in a pocket of the floor, and wherein the channel is at a first depth relative to a surface of the floor and the pocket is at a second depth greater than the first depth relative to the surface of the floor.

20. The method as recited in claim 19, wherein the floor is a cover of a battery assembly of the motor vehicle.

* * * * *